Jan. 10, 1967   G. M. GIBSON   3,296,892
CONSTANT SELECT SPEED ACCESSORY GROUP DRIVE
Original Filed Oct. 21, 1960   3 Sheets-Sheet 1

INVENTOR
Gordon M. Gibson

BY  Moore, Hall & Pollock
ATTORNEYS

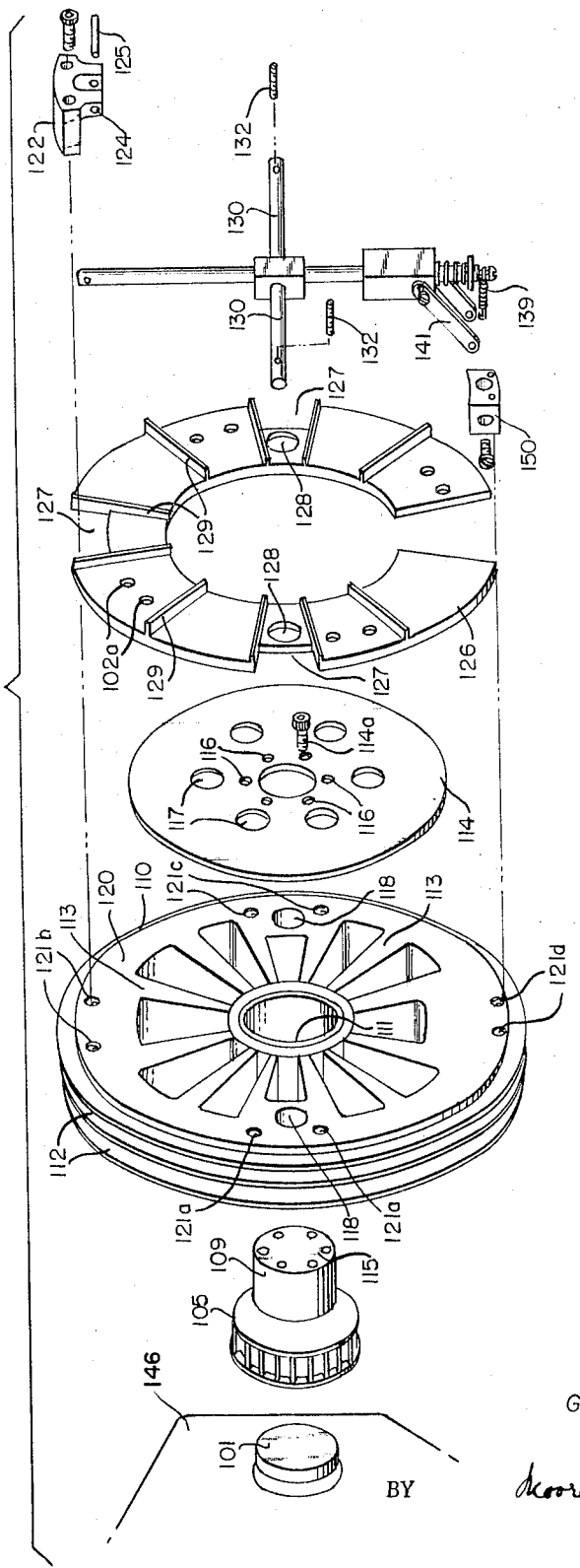

Jan. 10, 1967  G. M. GIBSON  3,296,892
CONSTANT SELECT SPEED ACCESSORY GROUP DRIVE
Original Filed Oct. 21, 1960  3 Sheets-Sheet 3

INVENTOR
Gordon M. Gibson

BY Moore, Hall & Pollock

ATTORNEYS

United States Patent Office 3,296,892
Patented Jan. 10, 1967

3,296,892
CONSTANT SELECT SPEED ACCESSORY GROUP DRIVE
Gordon M. Gibson, 740 Venice St., San Antonio, Tex. 78201
Continuation of application Ser. No. 71,856, Oct. 21, 1960. This application Apr. 24, 1964, Ser. No. 362,439
12 Claims. (Cl. 74—722)

The present invention relates to a constant select speed accessory group drive particularly adapted for use with internal combustion engines, and more particularly relates to such an accessory group drive comprising a liquid-free force transmitting means.

This application is a continuation of my copending application Serial No. 71,856, filed October 21, 1960, and now abandoned, which latter application is related in subject matter to that of my U.S. Patent No. 2,957,372, issued October 25, 1960, for Constant Speed Accessory Group Drive for Internal Combustion Engines.

Although the invention finds its principal application in the automotive field, there are numerous other applications including such devices as compressors, refrigeration equipment, etc.

Present-day automobiles are being increasingly loaded with accessories which now include an engine fan, a generator and battery combination, and may additionally include a radio, radio-telephone, air conditioning, air compressors, oil pumps for servo operations such as automatic shift, automatic top operation, window raising, built-in jacks, power steering, power brakes, trunk compartment, and the like. Where these devices are electrically operated, their motors or solenoids draw on the battery or the generator. Of these, the generator, fan, compressor and pumps must be designed to operate satisfactorily at engine idling speed, and also continue to operate satisfactory at top operating speed. The result of such design and arrangement is to limit car performance severely. This is true because, even though at their optimum speeds, the total power consumption of the accessories may be only a few horsepower, at high speed the parasitic power consumption may be higher than twenty-five horsepower or 10–20% of the engine output.

The use of the constant speed accessories group drive mechanism of this invention provides the following advantages:

(1) The entire electrical system of the car is supplied with substantially constant voltage from idle to top engine speed. This enables a manufacturer to redesign the generator to give better performance at less cost. Instead of a generator, a 60-cycle alternator can be used so that standard household appliances can be operated in or by the vehicle whether the engine is idling or operating at full speed.

(2) Constant voltage from the generator or alternator permits better operation of lights and radio; also, ignition is improved because there is a constant high primary voltage.

(3) The vehicle's battery is fully charged at all times, giving longer life and preventing sulphation. This, in turn, yields better starting of the engine, particularly in cold weather, because not only is the battery kept at peak charge, but only the motor need be turned over upon starting and not the whole accessory group.

(4) Improved cooling is provided under the most unfavorable conditions since the fan can be designed to operate at peak efficiency with the engine at idling speed and with the same efficiency at high engine speeds; the manufacturer need no longer make a compromise but can design a fan for a given speed which is both quiet and efficient; whereas, an automotive fan as now driven consumes six or seven horsepower at top engine speed and generates considerable noise. With increased efficiency through the use of this invention, the radiator core can be reduced by as much as 15–20%.

(5) Power steering is most needed when the car is being parked, at low engine speed, and when there is maximum resistance to turning due to tire friction. The invention provides trouble-free power steering when needed for parking, without the large parasitic loss due to pumping of oil even with a bypass at high speeds.

(6) There is more horsepower available for better performance at fast cruising speed and improved mileage and acceleration at moderate speeds. This is true because the accessory load is a constant, chosen for optimum accessory performance, and there is no added load as speed increases due to friction losses which add nothing to accessory performance but absorb up to twenty percent of horsepower output at high speeds. Much of the work of the accessory is required during traveling in traffic, when parking, starting, or stopping, at which time the engine is at relatively low or idling speed.

(7) Where compressor equipment is used for brakes and air conditioning, known requirements and a constant speed of equipment permit the design of equipment with greatly improved performance. Constant output permits the use of smaller and better compressors.

(8) Driven accessory equipment not only gives better performance but enjoys an increased useful life because it is never rotated needlessly at incredible and useless speeds. For example, equipment that must be designed to operate satisfactorily for an engine idling at 500 r.p.m. is rotated as high as 1200 r.p.m. when a car is at top speed. Not only does this introduce a speed factor of eight or ten, but wear and friction loss vary exponentially with speed. This invention opens up a whole new field of useful and appealing new appliances for use in vehicles. It frees design from crippling limitations which increase cost and make good performance difficult to achieve, and transitory when attained.

Described briefly, the invention includes a shaft which is driven by the drive shaft or crank shaft of the engine, includes an output shaft and pulley for driving automotive accessories, together with controlled friction coupling means therebetween which provides a substantially constant output r.p.m. for the accessories despite great variation in speed of the engine-driven shaft.

It is accordingly an object of the invention to provide means whereby all the accessories on an internal combustion engine are driven at a substantially constant optimum speed for all engine speeds from idling speed to full horsepower output at top speed.

It is another object of the invention to provide a means to operate each accessory at its individual optimum speed and to maintain that speed substantially independently of either engine speed or car speed.

It is a further object of the invention to provide a constant speed accessory drive having an engine-driven input means, an output means for driving one or more accessories, with a friction-controllable clutch means coupled therebetween, with the amount of friction being a function of the speed of the output means so that its speed remains substantially constant despite variations in engine speed.

The drawings are intended to be illustrative of the presently preferred forms which the invention may take, but are not intended to be limited thereto. Throughout the various figures of the drawings, like numerals refer to like parts.

In the drawings:

FIGURE 3 is an exploded perspective view of a portion of the accessory group drive apparatus of the present invention;

Figure 1:
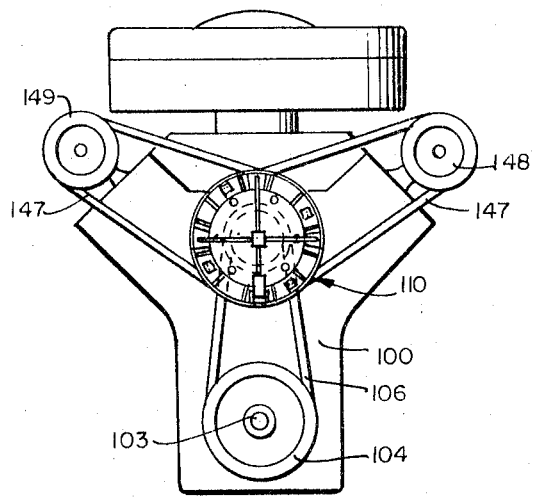
FIGURE 1 is a front elevation of an engine having the invention affixed thereto as one part thereof.

An engine 100 is provided with a stub shaft 101 adjustably mounted thereon by a suitable bracket means or flange 146. A drive shaft 103 has a drive pulley 104 mounted thereon which is driven at engine speed and may be eight or nine inches in diameter. A driven pulley 105 is mounted on the stub shaft 101 and is driven by belt 106 which, in turn, is driven by the drive pulley 104. In a preferred embodiment of the invention, the ratio of the pulley diameters of pulleys 104 and 105 is so selected that stub shaft 101 is driven with a rotational velocity two to three times the engine speed.

The select speed accessory drive unit 107 (see FIG. 2) of this invention comprises the stub shaft 101, the driven pulley 105, which is rotatably mounted upon the stub shaft 101 by a suitable bearing, and a cylindrical frame 110 formed with a plurality of driving pulleys 112 on its circumference, which drive typical accessories 148 and 149 such as generators, pumps, power steering apparatus, and the like, by means of belts 147. A fan 145 may be mounted on the front of the accessory drive apparatus by a suitable bracket means 102.

Referring now to FIGURE 3, the stub shaft 101 is shown together with its bracket means or flange 146, and driven pulley 105 which is mounted on the stub shaft 101 by a suitable bearing so that it freely rotates about shaft 101. Driven pulley 105 has an extension hub 109 which is integral therewith and serves as a journal for frame member 110 having a bearing surface 111, permitting member 110 to rotate freely on hub 109. Hub 109 has an axial length which is greater than the thickness of frame member 110 so as to extend therethrough, thereby permitting friction disc 114 to be fastened thereto by suitable cap screws 114a which pass through the respective holes 116 in plate 114 and thread into the tapped holes 115 in the projecting end of extension hub 109. Thus, friction disc 114 rotates with the driven pulley 105 at a speed depending upon the ratio between the radii of driving pulley 104 and driven pulley 105, which ratio may be in the order of two or three as previously mentioned.

Friction disc 114 may be made from nickel-steel or tungsten-steel stock, preferably 1/16 to 1/8 inch, and of a diameter smaller than that of frame member 110. Friction disc 114 is perforated by defining therein a plurality of apertures 117, whose function is to permit cooling air to pass therethrough so as to dissipate heat away from the disc. Perforations are also formed in frame member 110 between the successive ribs 113, thereby permitting cooling air such as that which may be provided by fan 145 (see FIG. 2) to pass through both discs 114 and frame member 110.

Frame member 110 is provided with two circular recesses 118, each of which receives the shank portion 118a (see FIGURE 6) of a friction element or pad 119 which is pressed into a respective recess 118 with an interference fit to ensure that it is securely held in position at all times. The enlarged flat head portion of each friction pad 119 which projects beyond the face 120 of frame member 110 provides a friction surface capable of bearing against one side of friction disc 114 outside of the circle of its air-cooling perforations 117.

Frame member 110 is provided with four pairs of tapped holes 121a, 121b, 121c, and 121d adjacent the periphery of its face 120. These pairs of tapped holes are located substantially equi-distantly about the periphery and each provides a means of fastening a support member to the face 120 of frame member 110. As better shown in FIGURE 4, three of the support members are pivot support members 122 fastened by appropriate screws to respective pairs of tapped holes 121a, 121b, and 121c. The fourth pair of tapped holes 121d receives screws which hold block 150 to frame member 110.

Figure 4:
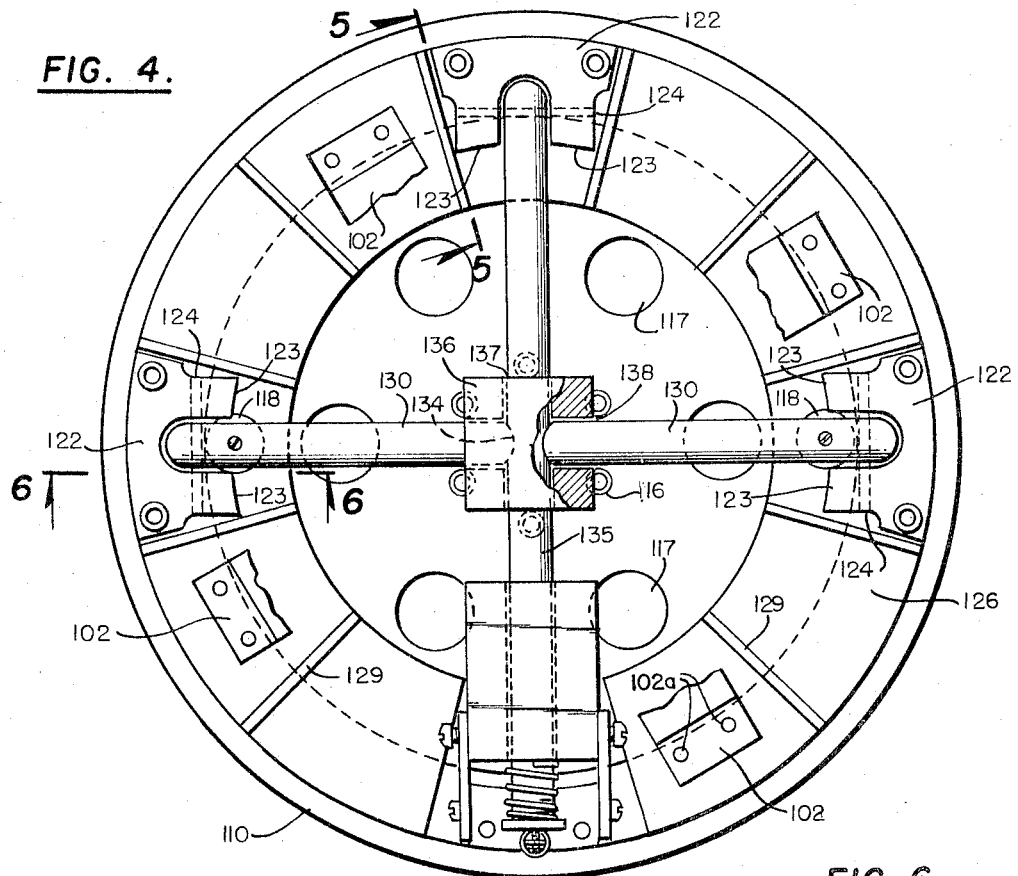
FIGURE 4 is an end view of the accessory group drive apparatus of the present invention.
Figure 5:
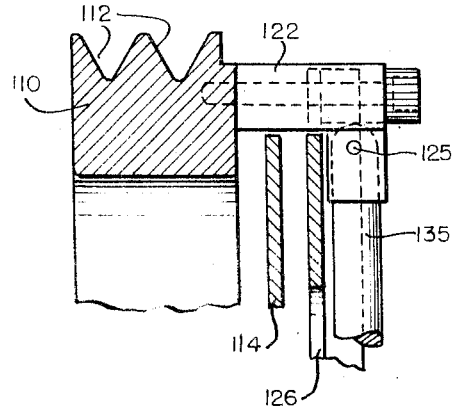
FIGURE 5 is a cross-sectional view taken along the line 5—5 of FIGURE 4.
Figure 6:
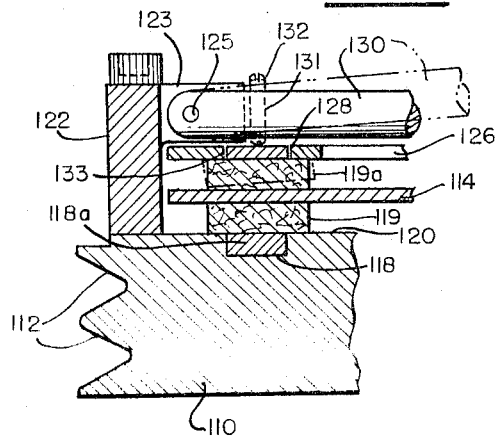
FIGURE 6 is a cross-sectional view taken along the line 6—6 of FIGURE 4.

The construction and mode of operation of the support members 122 may readily be ascertained from FIGURES 4, 5, and 6. FIGURE 4 shows that each of the pivot support members 122 has projecting bifurcated arms 123, which bifurcated arms are drilled at 124 to receive a pivot pin 125. Each bifurcated support member 122 is thus capable of pivotally supporting a rod which extends from the respective support member inwardly toward the center of frame member 110. For example, each of the rods 130 is pivotally supported about a pin 125 held by a respective pivot support member 122. The single transverse control rod 135 is similarly pivoted about a pin associated with a support member passing through the pair of tapped holes 121b.

A ring 126 is provided and has recesses 127 therein, each of which enables a support member 122 to pass therethrough and be screwed to the face 120 of member 110. Radial ribs 129 serve to strengthen ring 126. Ring 126 is also provided with two circular recesses 128 each so disposed as to lie directly opposite a corresponding recess 118 in frame member 110 when ring 126 is properly affixed. Each of the recesses 128 on ring 126 receives a respective friction pad 119a (see FIG. 6) which is similar to the friction pad 119 in frame 110 and has a shank portion which has a slidable fit in recess 128 but is so positioned relative to ring 126 that the enlarged head on each pad 119a is positioned to bear against friction disc 114 directly opposite to the similar friction pad 119 mounted in frame 110.

Each actuator rod 130 (see FIGS. 4 and 6) is drilled at 131 to receive a set screw 132 which bears upon a respective disc element 133 that is also slidable in recess 128 so that the disc element 133 presses against the shank portion of friction pad 119a with a force that depends upon the rotational position of the associated actuator rod 130. Thus, as can be seen in FIGURE 6, the rotational position of rod 130 about its pivot pin 125 determines the amount of pressure which is exerted from rod 130, through set screw 132, upon element 133, and through friction pad 119a, upon the surface of friction disc 114. In FIGURE 6, when rod 130 is in the solid-line position shown, maximum frictional force is exerted by friction pad 119a on the surface of disc 114 but it will be evident that as rod 130 is rotated counterclockwise to the dotted line position shown, that increasingly less pressure is exerted on disc 114. Although set screws 132 are shown as bearing on element 133 and then indirectly through friction pad 119a upon disc 114, it will be understood that the disc 114 itself could be made subject to the action of set screws 132.

As shown in FIGURE 4, the opposite or inner end of each of the rods 130 is rounded to fit into a recess 134 in the shank of control rod 135 and with a sliding fit within the pivot block 136. Block 136 is provided with perpendicular cross channels 137 and 138 to receive respectively the control rod 135 and the convex end of each actuator rod 130. Channel 137 receives rod 135 snugly, but channel 138 provides a relatively loose fit for rods 130 permitting them to rotate with respect to rod 135 by sliding action at their recessed portions 134 as the rods 130 pivot about their pins 125.

In FIGURE 4, the upper end of rod 135 is shown as being drilled and pivotally mounted in a support member 122 in a manner similar to that provided for each of the actuator rods 130. This mounting arrangement with respect to rod 135 is most clearly shown in the cross-sectional view of FIGURE 5. The other end of control rod 135 is resiliently connected to frame 110 through a mechanism which is best illustrated in FIGURE 7 although also shown in FIGURE 4.

Figure 7:
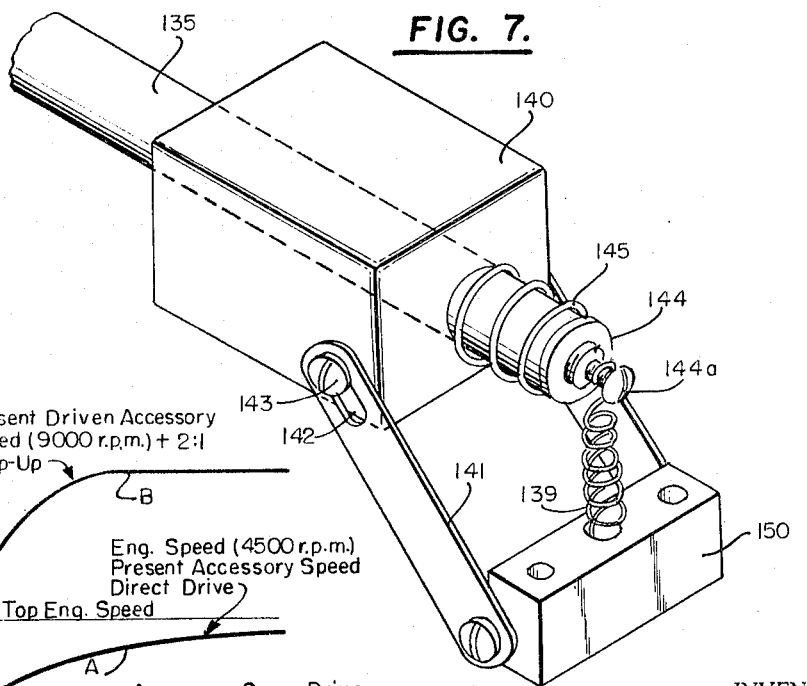
FIGURE 7 is a perspective view of a detail showing a centrifugal weight as an operative part of the invention.

Referring to FIGURE 7, a movable governor weight 140 is slidably mounted at the end of rod 135 but is restrained in one direction on rod 135 by compression spring 145 and in the other direction by lost-motion linkage 141. At slow or idling engine speeds, rod 135 is held closely toward face 120 of frame member 110 by spring 139, one end of which is fastened around a screw 144a threaded into the end of rod 135, and the other end of which is affixed to block 150, which block 150 is, in turn, fastened to frame 110 by cap screws threaded into tapped holes 121d (see FIG. 3). The movable governor weight 140 is also connected to supporting block 150 by a lost motion linkage including links 141 having elongate slots 142 through which screws 143 loosely connect to weight 140 and link 141. The movable end of control rod 135 is also externally threaded to receive a circular adjustment nut 144 which adjusts the compression of spring 145a surrounding rod 135 between the governor weight 140 and the adjustment nut 144.

Fan 145 is mounted on the front of ring 126 by a suitable means represented in FIGURE 4 by a fragmentary showing of portions of bracket 102, the various portions of which at their contacting points with surface 120 of frame member 110 are connected thereto by means of suitable screws 102a or the like.

The operation of the device is as follows:

With the engine idling, the step-up ratio of pulleys 104 and 105 drives pulley 105 at between 1000 and 1500 r.p.m. depending upon the ratio of pulley diameters selected. Pulley 105 drives friction plate or disc 114 at the same speed. Spring 139 is selected to provide enough initial pull on control rod 135 to rotate each of the rods 130 inwardly toward the face 120 of frame member 110, doing so through the medium of the pivot block 136, whereby each of the rods 130 tends to press its respective friction pad 119a tightly against the surface of the friction disc 114. Sufficient friction thus exists that disc 114 as it rotates, tends to rotate frame member 110 with it at sufficient speed to drive the accessories 148, 149, etc., additional shafts and pulleys being used as may be required. Spring 145a is adjusted by means of nut 144 to position governor weight 140 properly and to provide proper control function thereof. All accessories are now operating at optimum speed at the knee of curve C of FIGURE 8, which is two or three times the idling engine speed, depending upon the step-up ratio of the pulley 104, 105.

As the engine 100 speeds up to increase car speed, weight 140 moves radially outward along control rod 135 against the action of spring 145a which it compresses. As weight 140 moves outwardly by reason of centrifugal force, it takes up the lost motion in slot 142 of link 141 until further movement of weight 140 rotates links 141 outwardly, forcing rod 135 away from ring 126 against the action of spring 139. Rod 135 then pivots about its pivot 124 and moves the pivot block 136 outwardly, at the same time rotating each of the actuator rods 130 about its pivot and away from the face 120 of frame 110. This action moves set screws 132 and decreases the force exerted by friction elements 119a and the counter force exerted by the similar element 119 on disc 114. As a result, disc 114 slips by an amount which increases with engine speed and maintains the accessory group speed on curve C of FIGURE 8 rather than on a curve such as curve B.

The select speed accessory drive described above is efficient and trouble-free in operation. Friction disc 114 and friction elements 119 have long life and can be readily replaced if found to be defective. The action of elements 119 on disc 114 is nicely controlled; there is approximately a 20:1 mechanical advantage between pivot block 136, set-screw 132, and pivot pin 125, so that small movements of governor weight 140 exert effective control.

Figure 8:
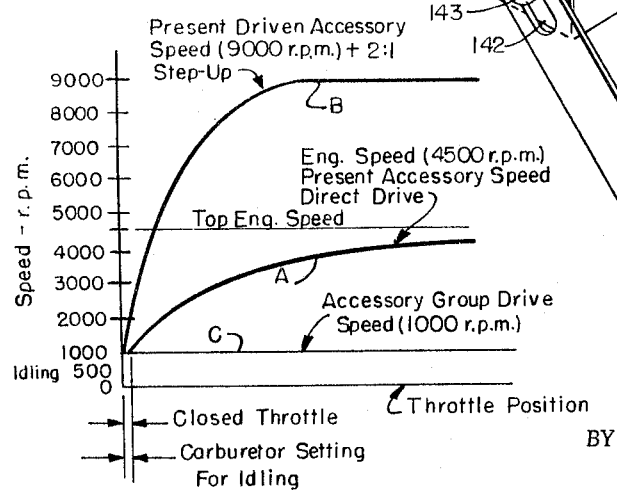
FIGURE 8 is a graphical representation of engine and accessory speed plotted against throttle position, showing the operation of the invention.

FIGURE 8 shows the relative speed characteristics in r.p.m. plotted against throttle position. It will be noted that a closed throttle condition is offset to the right of the origin of the graph in normal operation because, for most passenger cars, the idle adjustment speed permits the engine to operate at between 400 and 500 r.p.m. Curve A shows the speed characteristic of the engine and those accessories which are directly driven at a 1:1 ratio by the engine. Curve B shows the speed characteristic of accessories driven by the engine at a 2:1 step-up ratio. In some cases where higher ratios are used the accessory speeds reach the ruincus value of 12,000 r.p.m. at top engine speed.

Figure 2:
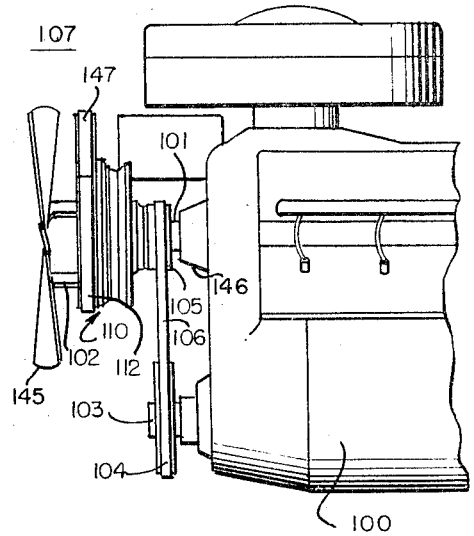
FIGURE 2 is a fragmentary side view of the engine of FIGURE 1, also showing a portion of the apparatus of the present invention.

Curve C shows the group accessory speed using the invention shown in FIGURES 1, 2, 5, or equivalent. The knee of the curve C is at or just to the left of the closed throttle ordinate, so that the effective part of the curve C is a horizontal line representing a speed value of 1000, 1200 or 1500 r.p.m. The initial rise of curve C is a direct function of the drive ratio and it is an important part of the invention that this initial step-up provides optimum or entirely acceptable accessory operation at idling speed of the engine.

The optimum speeds of the individual accessories, although substantially constant, need not be and usually are not the same. An optimum speed for each basic accessory such as the fan, generator, servo-oil pump, water pump, compressor and the like may be obtained by using a driven pulley of the proper diameter in each case bearing the correct relation of the linear speed of the belt. Where gearing is substituted for belt drive, the same relationships are involved.

While there have been described above what are at present considered to be the preferred embodiments of the invention, it will be apparent to those skilled in the art that various changes and modifications may be made therein without departing from the spirit or scope of the invention. While the modifications discussed above clearly fall within the terms of one or more of the claims and are covered thereby, the wording of the several claims has been chosen so as to be generic to those other various changes, and modifications may be made therein without departing from the spirit or scope of the invention.

What I claim is:

1. In combination, an engine having a drive shaft, a counter shaft driven by said drive shaft at a stepped-up ratio, output means for operation of accessories, and means coupling said drive shaft to said output means for operating the latter at a substantially constant speed irrespective of a wide range of engine speeds, said coupling means comprising first means including a disc, second means including at least one friction element adapted to exert frictional force against the face of said disc, and speed responsive means connected to said output means for adjusting the frictional force between said friction element and said disc in accordance with the rotational speed of said output means, said drive shaft being operatively connected to one of said first and second means and said output means being operatively coupled to the other of said first and second means.

2. The combination of claim 1 wherein said disc is driven directly by said counter shaft and said output means carries said friction element.

3. The combination of claim 2 wherein said output means includes a rotatable frame member and said coupling means includes a movable weight operatively connected to said frame member and being mounted for movement under centrifugal action in response to rotation of said frame member, and linkage means connected between said movable weight and said friction element for decreasing the frictional force between said friction element and said disc as said output means increases its rotational speed above a predetermined value and moves said weight outwardly under centrifugal action.

4. The combination of claim 3 which further includes an adjustable compression spring adapted under compression to resist the outward movement of said weight in response to said centrifugal force.

5. The combination of claim 3 in which said linkage means includes a lost-motion element permitting a predetermined maximum outward movement of said weight under centrifugal action before said moving weight acts to decrease said frictional force between said friction element and said disc.

6. An accessory drive device for an engine having a drive shaft and a plurality of accessories, said drive device comprising a plurality of relatively movable coupling members, one of said coupling members being constructed to be driven from an engine drive shaft at a stepped-up ratio with respect to an engine drive shaft, a second coupling member being constructed to drive at least one accessory, means for transmitting mechanical force from one to the other of said coupling members, and means controlling the force transmitted by said force-transmitting means in such a manner that said second coupling member provides a substantially constant speed output over the major portion of the range of speed of the engine between idling speed and full engine speed.

7. The combination set forth in claim 6, said force transmitting means comprising a disc, spaced friction elements carried by at least one of said coupling members and mounted to engage said disc in variable frictional contact, said means controlling the transmission of force comprising governing means having spring-biased movable weight and linkage means for varying the frictional contact between said spaced friction elements and said disc in such manner that the frictional force is decreased as engine speed increases from idling speed causing increasing slip between said friction elements and said disc as engine speed approaches full speed, said substantially constant output speed being greater than the idling speed of the engine, and less than full speed of the engine.

8. The combination set forth in claim 6, said means for controlling the transmission of force, comprising speed responsive means driven from said second coupling member and connected to maintain the mechanical force transmitted between said coupling members at a value which produces said substantially constant speed output substantially independent of the changes in the engine speed over the major portion of the range of engine speed.

9. The combination set forth in claim 8, said means for controlling the transmission of force comprising a governor having a rotating mass, said force transmitting means comprising friction elements which frictionally engage under the control of said rotating mass and provide increasing slip between said coupling members as the engine speed increases from idling speed.

10. An accessory group drive for an engine having a plurality of accessories, said drive comprising a plurality of relatively movable coupling members, one of said coupling members being constructed to be driven by said engine at a stepped-up ratio with respect to the idling speed of said engine, a second coupling member being constructed to drive at least one accessory, means for transmitting mechanical force from one to the other of said coupling members and means for controlling the force transmitted by said force-transmitting means in such a manner that said second coupling member provides a substantially constant speed drive for said accessory over the major portion of the range of speed of the engine between idling speed and full engine speed, said first coupling member comprising a friction disc mounted for rotation at said stepped-up ratio, said second coupling member comprising a frame member having means thereon for driving said accessory, said force controlling means comprising a first plurality of spaced friction elements carried by said frame member and mounted to engage said disc on one side thereof, a ring member, a second plurality of spaced friction elements carried by said ring member on the opposite side of said disc from said first plurality and a speed controlled system of highly leveraged arms pivoted on said frame member and acting upon said second plurality of spaced friction elements to apply said elements with controlled force against said disc to provide a controlled frictional engagement between both said pluralities of spaced frictional elements and said friction disc and to cause controlled relative movement between said disc and said pluralities of frictional elements whereby said frame member and said means thereon for driving said accessory cause said accessory to be driven at said substantially constant speed substantially independently of changes of engine speed between idling speed and full engine speed.

11. The combination set forth in claim 10, said disc being constructed of a high temperature resistant metal alloy, and cooling means for said disc.

12. The combination set forth in claim 11, said force controlling means comprising a spring biased mass mounted on said frame member for rotation therewith and constructed to move in response to changes in angular acceleration of said mass and thereby to control the force urging said friction elements and maintain said substantially constant speed.

References Cited by the Examiner
UNITED STATES PATENTS
2,957,372   10/1960   Gibson _____ 74—722

DAVID J. WILLIAMOWSKY, *Primary Examiner.*

H. S. LAYTON, *Assistant Examiner.*